United States Patent

Karasaki et al.

Patent Number: 5,422,906
Date of Patent: Jun. 6, 1995

[54] LASER RESONATOR

[75] Inventors: Hidehiko Karasaki, Ashiya; Shigeki Yamane, Kobe, both of Japan

[73] Assignee: Matsushita Electric Industrial Co., Ltd., Osaka, Japan

[21] Appl. No.: 153,105

[22] Filed: Nov. 17, 1993

[30] Foreign Application Priority Data

Nov. 18, 1992 [JP] Japan .................. 4-307475
Oct. 25, 1993 [JP] Japan .................. 5-266117

[51] Int. Cl.6 .................................. H01S 3/03
[52] U.S. Cl. .................................. 372/61; 372/99; 372/108
[58] Field of Search ............ 372/38, 61, 99, 102, 372/108

[56] References Cited

U.S. PATENT DOCUMENTS 3,928,817 12/1975 Chodzko .
4,410,992 10/1983 Javan ................. 372/32
4,696,017 9/1987 Harshaw .
4,852,116 7/1989 Takiguchi et al. .
4,887,276 12/1989 Bluege .
4,932,034 6/1990 Usami et al. .
4,993,801 2/1991 Sarraf ................. 372/36
5,040,188 8/1991 Lang et al. .
5,081,635 1/1992 Wakabayashi et al. .

FOREIGN PATENT DOCUMENTS 3-231482 10/1991 Japan .

Primary Examiner—Rodney B. Bovernick
Assistant Examiner—Robert E. Wise
Attorney, Agent, or Firm—Wenderoth, Lind & Ponack

[57] ABSTRACT

A laser resonator includes; an optical oscillator including a discharge tube, and a pair of reflecting mirrors arranged at both ends of the discharge tube while inner surfaces of the mirrors confront each other; electrodes confronting each other with the discharge tube held therebetween; a gas pipe connected to the optical oscillator, and a gas circulating device connected to the gas pipe for circulating laser gas, wherein the laser resonator generates laser light when a voltage impressed to the electrodes invites discharge of the discharge tube while laser gas is circulated in the discharge tube by the gas circulating device. The laser resonator further includes a diffraction grating provided at one outer surface of either of the pair of reflecting mirrors to take out a part of the laser light passing through the reflecting mirror in a direction of a predetermined angle, and a photodetector for detecting an intensity of the laser light, the photodetector being disposed in the direction of the predetermined angle of that part of the taken-out laser light.

8 Claims, 10 Drawing Sheets

LASER RESONATOR

BACKGROUND OF THE INVENTION

The present invention relates to a laser resonator for generating a laser light to cut or weld such hard and rigid materials as metals, ceramics, etc.

It has been popular in recent years to cut or weld metals, ceramics or the like hard materials by an apparatus utilizing laser light of a high energy density.

The structure of a conventional laser resonator used in the above processing apparatus will be explained with reference to FIG. 11.

Figure 11:
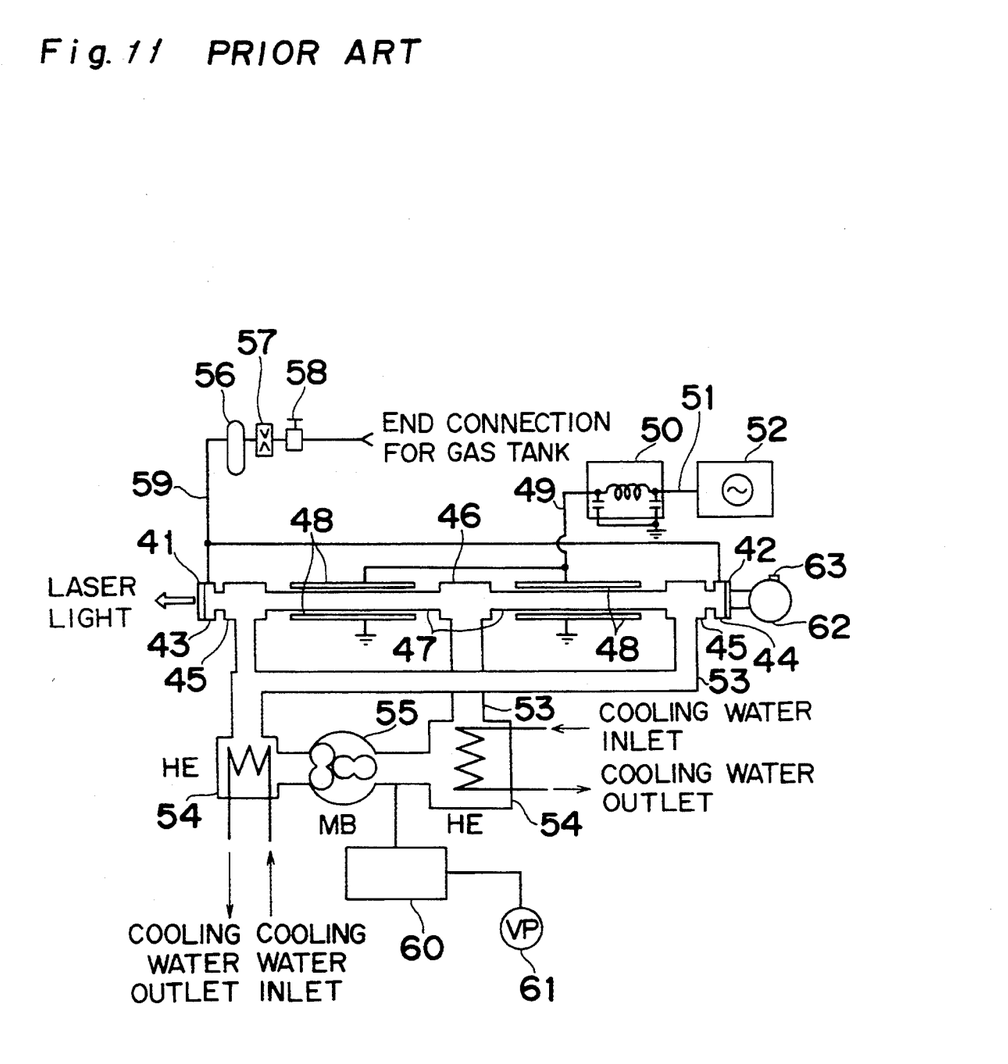
FIG. 11 is a diagram of the structure of a conventional laser resonator.

In FIG. 11 showing the structure of a conventional laser resonator: element 41 is an output mirror through which the laser light is emitted; element 42 is a terminal mirror for reflecting the laser light; element 45 is a main flange; element 46 is a central block; element 47 is a discharge tube; element 48 is an electrode for starting the discharge; element 49 is a copper plate to impress a high frequency current to each electrode; element 50 is a matching circuit network of the high frequency current; element 51 is a coaxial cable; element 52 is an RF power source; element 53 is a piping; element 54 is a heat exchanger; element 55 is a mechanical booster pump; element 56 is a filter; element 57 is an orifice; element 58 is a regulator; element 59 is a PFA pipe; element 60 is a gas pressure regulating unit; element 61 is a vacuum pump (oil rotary pump); element 62 is an integrating sphere; element 63 is a photodetector.

The resonating ratio of the output mirror 41 and the terminal mirror 42 is controlled by respective adjusting bases 43 and 44.

The operation of the conventional laser resonator constituted as above is described.

The output mirror 41 and the terminal mirror 42 which are placed at both ends of one or a group of a plurality of discharge tubes 47 are supported by the respective bases 43 and 44. The angles of the mirrors 41 and 42 are adjusted so that the optical axes are parallel to the discharge tubes 47. In an optical oscillator thus formed, the power from the RF power source 52 is sent, via the coaxial cable 51, to the matching circuit network 50, where the power is converted to the conjugate complex impedance of the impedance of the discharge tubes 47. The RF power is transmitted through the copper plate 49 to the electrodes 48, with initiating the discharge of the discharge tubes 47. The piping 53 connected to the optical oscillator constitutes a vacuum container together with the main flange 45 and the central block 46. The laser gas is circulated within the vacuum container by the mechanical booster pump 55. The heat exchanger 54 is provided in the middle of the piping 53 so as to remove both the compression heat generated by the mechanical booster pump 55 and the heat resulting from the discharge of the discharge tubes 47. The laser light obtained by the discharge of the discharge tubes 47 is partly emitted through the output mirror 41 to be used to cut metallic or ceramic materials.

In this case, since a part of the laser gas is dissolved when the discharge tubes 47 operate, it is necessary always to supply fresh laser gas to the discharge tubes 47. The fresh laser gas is supplied from the vicinity of the output mirror 41 to the optical oscillator through the PFA piping 59. At this time, the gas pressure is reduced by the regulator 58, and the flow rate is controlled by the orifice 57, and moreover the contaminant is removed by the filter 56. Meanwhile, the exhaust system is connected at the sucking side of the mechanical booster pump 55 to the vacuum pump 61 via the gas pressure regulating unit 60.

Apart from the laser light emitted through the output mirror 41, a part of the laser light is output from the terminal mirror 42. After the intensity of the laser light is attenuated by the integrating sphere 62, the laser light is introduced into the photodetector 63. This laser light is utilized for the purpose of monitoring, feed-back or diagnosis in the form of output signals of the photodetector 63.

In the meantime, Japanese Laid-Open Patent Publication No. 3-231482 discloses the arrangement to measure the intensity of the laser light output from a laser resonator thereby to feedback the laser output.

In the prior art as above, the integrating sphere 62 is always required so as to monitor the laser light projected from the terminal mirror 42. Therefore, it is disadvantageous that the optical axis of the integrating sphere 62 is necessary to be adjusted at the mounting time of the integrating sphere 62, and the reflectivity of the reflecting surface of the integrating sphere 62 is changed with time due to temperature changes, which results in the deterioration of the monitoring accuracy.

Moreover, since and when the burning pattern of acrylic acid or the like should be collected in order to adjust the transverse mode of the laser light in the prior art, the resultant gas is harmful to human bodies and it is necessary to discharge the gas after a special treatment.

SUMMARY OF THE INVENTION

The object of the present invention is therefore to provide a laser resonator which can monitor the laser light with high accuracy without being adversely influenced by changes with time and temperature change.

In accomplishing these and other objects, according to a first aspect of the present invention, there is provided a laser resonator comprising: an optical oscillator including a discharge tube, and a pair of reflecting mirrors arranged at both ends of the discharge tube while inner surfaces of the mirrors confront each other; electrodes confronting each other with the discharge tube held therebetween; a gas pipe connected to the optical oscillator; and a gas circulating device connected to the gas pipe for circulating laser gas, wherein the laser resonator generates laser light when a voltage impressed on the electrodes invites discharge of the discharge tube while laser gas is circulated in the discharge tube by the gas circulating device, the laser resonator further comprising: a diffraction grating provided at one outer surface of either of the pair of reflecting mirrors to take out a part of the laser light passing through the reflecting mirror in a direction of a predetermined angle; and a photodetector for detecting an intensity of the laser light, the photodetector being disposed in the direction of the predetermined angle of the part of the taken-out laser light.

According to a second aspect of the present invention, there is provided a laser resonator comprising: an optical oscillator including a discharge tube, and a pair of reflecting mirrors arranged at both ends of the discharge tube while inner surfaces of the mirrors confront each other; electrodes confronting each other with the discharge tube held therebetween; a gas pipe connected to the optical oscillator; and a gas circulating device connected to the gas pipe for circulating laser gas, wherein the laser resonator generates laser light when a voltage impressed to the electrodes invites discharge of the discharge tube while laser gas is circulated in the discharge tube by the gas circulating device, the laser resonator further comprising: a diffraction grating provided at an outer surface of each of the pair of reflecting mirrors to take out a part of the laser light passing through the reflecting mirror in a direction of a predetermined angle to form a circumference of the laser light outside the reflecting mirror; photodetectors set on each circumference of the above taking out-angle for detecting an intensity of the laser light; and an inclining device for inclining each mirror so that output signals of the photodetectors set on each circumference with each other.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

A preferred embodiment of a laser resonator of the present invention will be discussed with reference to the accompanying drawings.

Figure 2:
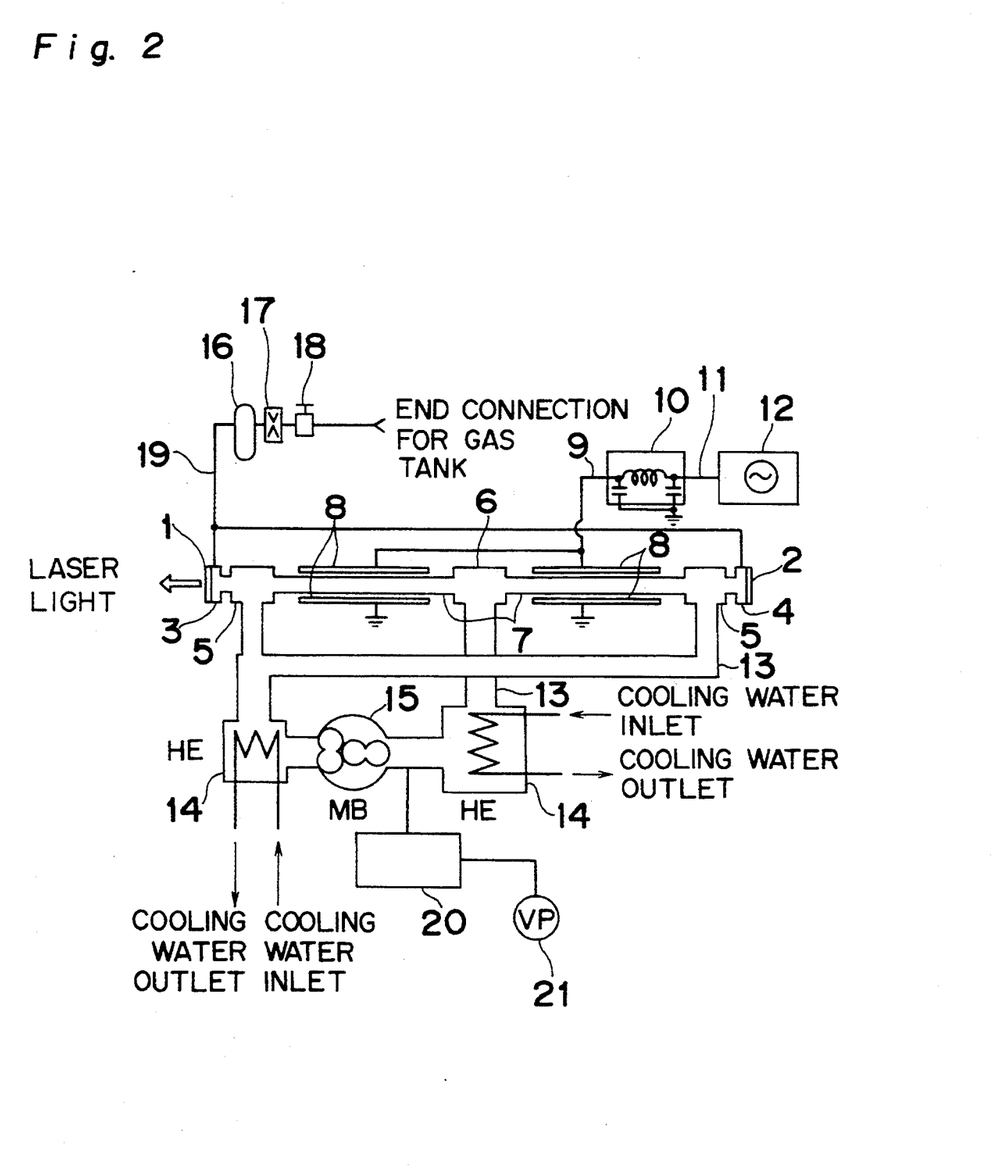
FIG. 2 is a diagram showing an example of the structure of the laser resonator according to the embodiment.

FIG. 2 shows a laser resonator of one embodiment of the present invention which has a diffraction grating at the outside of an output mirror or a terminal mirror at either end of a discharge tube. The structure of the laser resonator in FIG. 2 is generally the same as that of the conventional laser resonator shown in FIG. 7, except that the integrating sphere 62 is omitted. In the embodiment of the present invention, the photodetector 63 in the conventional laser resonator is integrally formed with an adjusting base 3 or 4.

More specifically, referring to FIG. 2, element 1 is an output reflecting mirror for emitting laser light; element 2 is a terminal reflecting mirror for reflecting the laser light; element 3 is an adjusting base for adjusting the output mirror; element 4 is an adjusting base for adjusting the terminal mirror 2 to control the resonating ratio along with the adjusting base 3 and 4; element 5 is a main flange; element 6 is a central block; element 7 is a discharge tube; element 8 is an electrode for starting the discharge; element 9 is a copper plate as a waveguide which impresses a high frequency current to the electrodes 8; element 10 is a matching circuit network of the high frequency current; element 11 is a coaxial cable; element 12 is an RF power source; element 13 is a piping; element 14 is a heat exchanger; element 15 is a mechanical booster pump; element 16 is a filter; element 17 is an orifice; element 18 is a regulator; element 19 is a PTFE pipe made of polytetrafluoroethylene; element 20 is a gas pressure regulating unit; and element 21 is a vacuum pump (oil rotary pump).

The laser resonator of the present invention constituted of the above-described elements operates as follows.

The output mirror 1 and the terminal mirror 2 are arranged at both ends of one or a plurality of discharge tubes 7 and held by the corresponding adjusting bases 3 and 4. The angles of the mirrors 1 and 2 are adjusted so that the optical axes thereof are parallel to the axis of the discharge tubes 7. Thus, the optical oscillator is constituted. The power from the RF power source 12 is fed to the matching circuit network 10 through the coaxial cable 11 and converted to the conjugate complex impedance of the impedance of the discharge tubes 7. Accordingly, the RF power is transferred to the electrodes 8 via the copper plate 9, whereby the discharge tubes 7 start discharging. The piping 13 connected to the optical oscillator defines a vacuum container together with the main flange 5 and the central block 6. Laser gas is circulated within the vacuum container by the mechanical booster pump 15. Compression heat generated by the mechanical booster pump 15 and heat generated by the discharge of the discharge tubes 7 are removed by the heat exchangers 14 provided in the middle of the piping 13. The laser light resulting from the discharge is partly emitted from the output mirror 1 and is utilized to cut metallic or ceramic materials.

Figure 1:
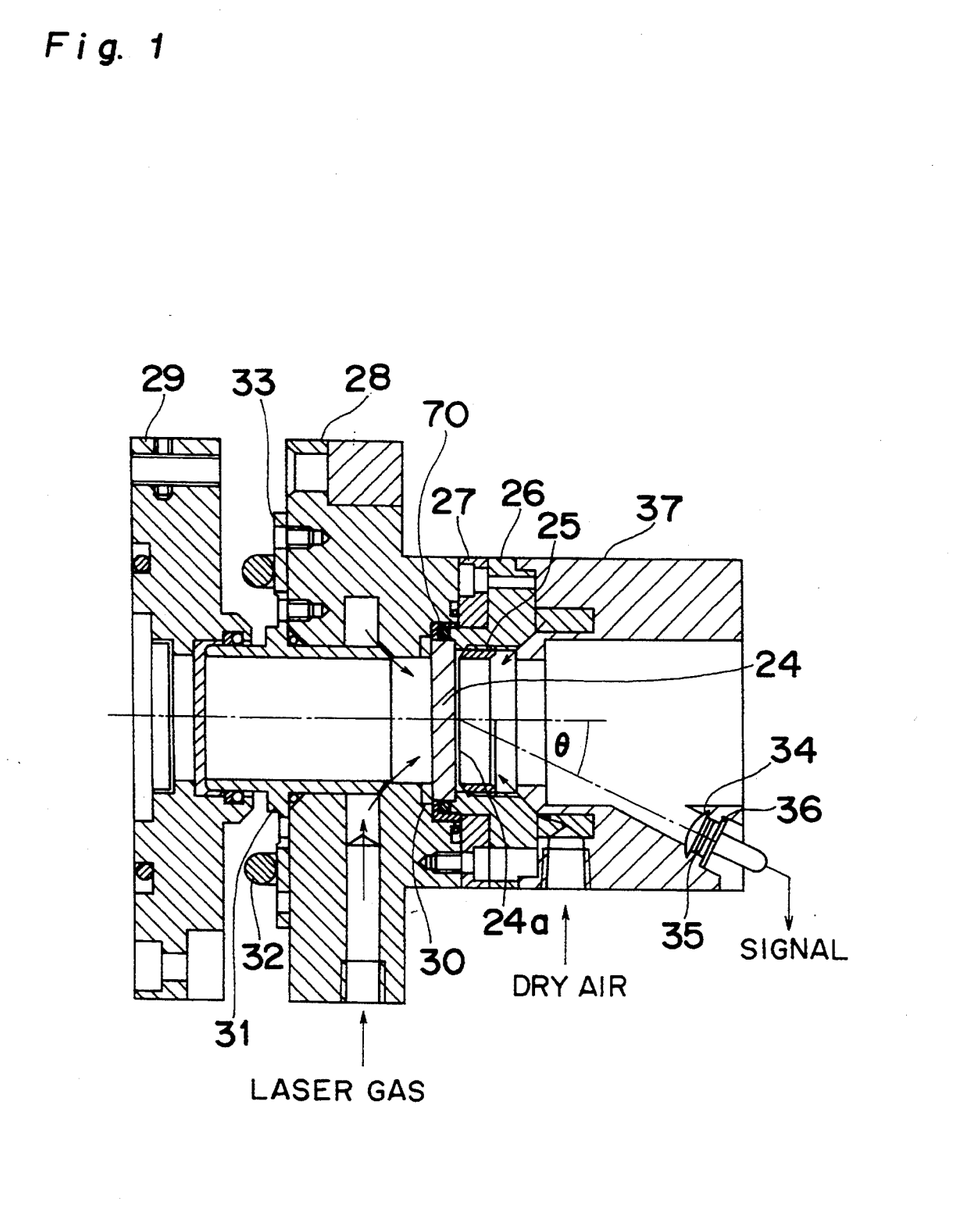
FIG. 1 is a cross-sectional view showing the structure of an output mirror section or a terminal mirror section of a laser resonator according to one embodiment of the present invention.

The structure of the output mirror section which is the same as the terminal mirror section in the present embodiment is indicated in FIG. 1. In FIG. 1, element 24 is an output mirror having a diffraction grating surface; element 25 is a mirror fixing ring; elements 26 and 27 are mirror holders; element 28 is an adjusting plate; element 29 is a fixed plate; element 30 is an adjusting ring; element 31 is a connecting pipe; element 32 is a water cooling pipe; element 33 is a cooling plate; element 34 is a condenser lens; element 35 is a wavelength window; element 36 is a photodetector; and element 37 is a mirror holder. The output mirror 24 is gripped by the mirror holders 26 and 27 and fixed to the adjusting ring 30 secured on the adjusting plate 28. The curvature of the adjusting ring 30 agrees with that of the inner surface of the mirror defining the optical oscillator.

Further, the output mirror 24 is tightly pressed by the mirror fixing ring 25 to the side of the adjusting plate 28 via an O-ring 70.

Subsequently, the mirror holder 37 is mounted to fix a mechanism to blow dry air. The mirror holder 37 having the condenser lens 34, the window 35, and the photodetector 36 detects the intensity of the laser light. The angle of the adjusting plate 28 to the fixed plate 29 can be changed freely as described later. The plates 28 and 29 are coupled to each other by the connecting pipe 31. The fixed plate 29 is secured to the main flange 5 of FIG. 1. The adjusting plate 28 is cooled by the water cooling pipe 32 via the cooling plate 33 to be kept at a constant temperature at all times.

Figure 3:
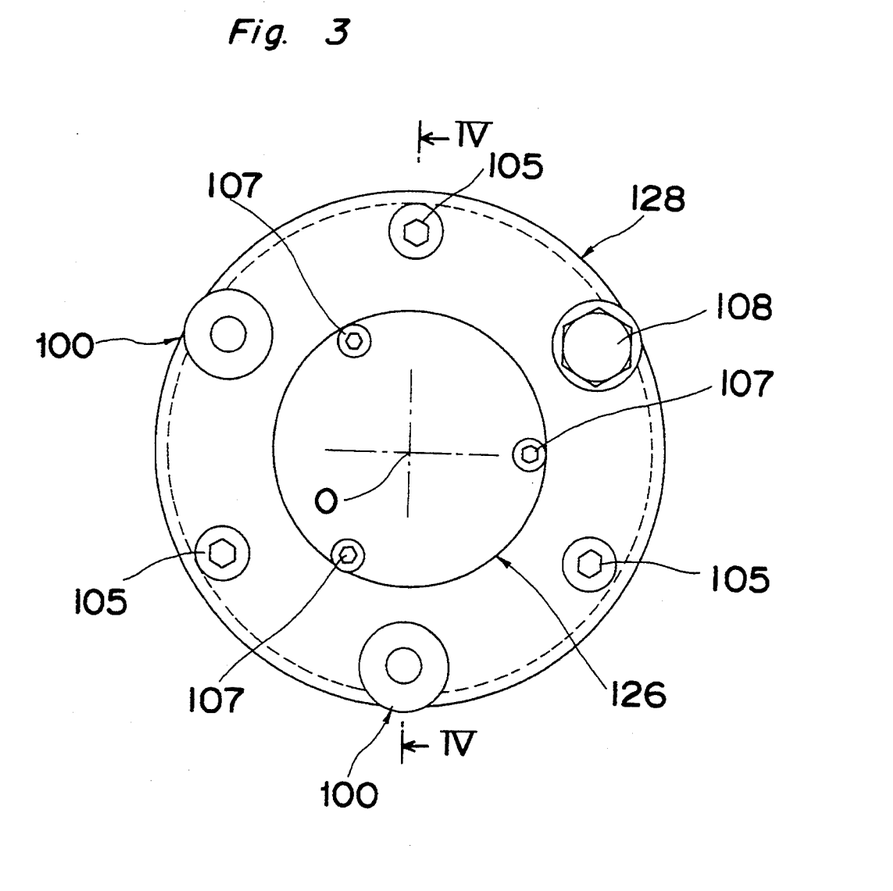
FIGS. 3 and 4 are a side view and a cross-sectional view taken out by line IV—IV in FIG. 3 showing the concrete structure of the output mirror section of the laser resonator in FIG. 1.

An operation for inclining the mirror 24 with respect to the optical axis of the resonator is described below with reference to FIGS. 3-5.

Figure 4:
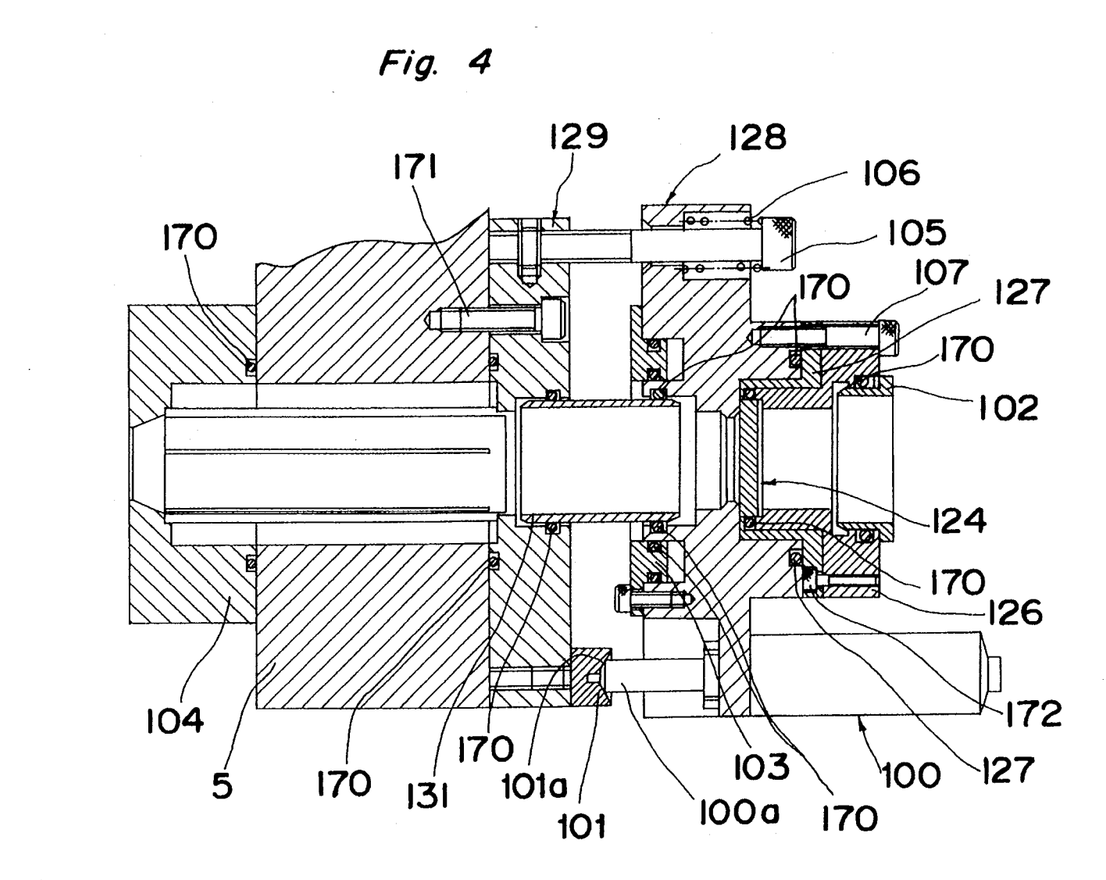
Figure 5:
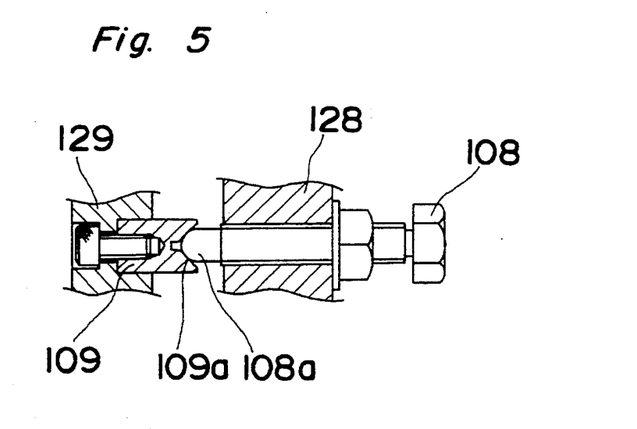
FIG. 5 is a partial cross-sectional view showing a fixed shaft in the section in FIG. 3.

The structure of the output mirror section in FIG. 4 is similar to that in FIG. 1 and is more concrete than FIG. 1.

In FIG. 4, element 124 is an output mirror; elements 126 and 127 are mirror holders; element 128 is an adjusting plate; element 129 is a fixed plate; and element 131 is a connecting pipe. These members have the same functions as the corresponding members in FIG. 1, respectively. Element 100 is a pulse motor; element 101 is a receiving member; element 102 is a receiving member for a connecting pipe; element 103 is a lid; element 104 is a cathode spacer; element 105 is a bolt; element 106 is an alignment spring; element 107 is a bolt; and element 170 is an O-ring. The connecting pipe 131 is held by the fixed plate 129 and the adjusting plate 128 via O-rings 170 so as to allow the inclination of the adjusting plate 128 to the fixed plate 129. The fixed plate 129 is fixed to the outer surface of the main flange 5 by bolts 171 via the O-ring 170. The cathode spacer 104 is attached to the inner surface of the main flange via the O-ring 170. The adjusting plate 128 holds the mirror 124 on its outer surface while the mirror 124 is held between the adjusting plate 128 and the mirror holders 126 and 127 via the O-ring 170. The mirror holder 126 fixed to the mirror holder 127 by bolts 172 is fixed to the adjusting plate 128 by the bolts 107. The receiving member 102 for a connecting pipe is fitted into the mirror holder 126 via the O-ring 170. The lid 103 is attached onto the inner surface of the adjusting plate 128 via the O-rings 170. The adjusting plate 128 is adjustably connected to the fixed plate 129 by the bolts 105 via the alignment springs 106 so as to allow the inclination of the adjusting plate 128 to the fixed plate 129. As shown in FIGS. 3-5, the two pulse motors 100 and a bolt 108 and the three bolts 105 are arranged on the same circumference on the adjusting plate 128. As shown in FIG. 3, the bolt 108 serves as a fixed shaft for a fulcrum, and the movable shafts 100a of the two pulse motors 100 serve as adjusting shafts. The movable shafts 100a of the two pulse motors 100 are respectively received by recesses 101a in V-shaped section of the receiving members 101 fixed to the fixed plate 129. The end of the bolt 108 is received by a recess 109a in V-shaped section of a receiving member 109 fixed to the fixed plate 129 as shown in FIG. 5. Thus, when each of the pulse motors 100 is driven, the pulse motor 100 is moved together with the adjusting plate 128 with respect to the fixed plate 129 because the end of the movable shafts 100a of the motors 100 is prevented from moving leftward in FIG. 4 by the fixed plate 129. Then, the motors 100 are moved rightward or leftward in FIG. 4 and thus the adjusting plate 128 is inclined to the fixed plate 129 while the bolt 108 is served as a fulcrum so that the mirror 24 is inclined with respect to the optical axis of the resonator. In the structure, when the two pulse motors 100 are replaced by micrometers, the adjusting plate 128 is manually inclined to the fixed plate 129 by rotating the micrometers by hand.

A control operation of the resonator will be described below with reference to FIG. 6.

Figure 6:
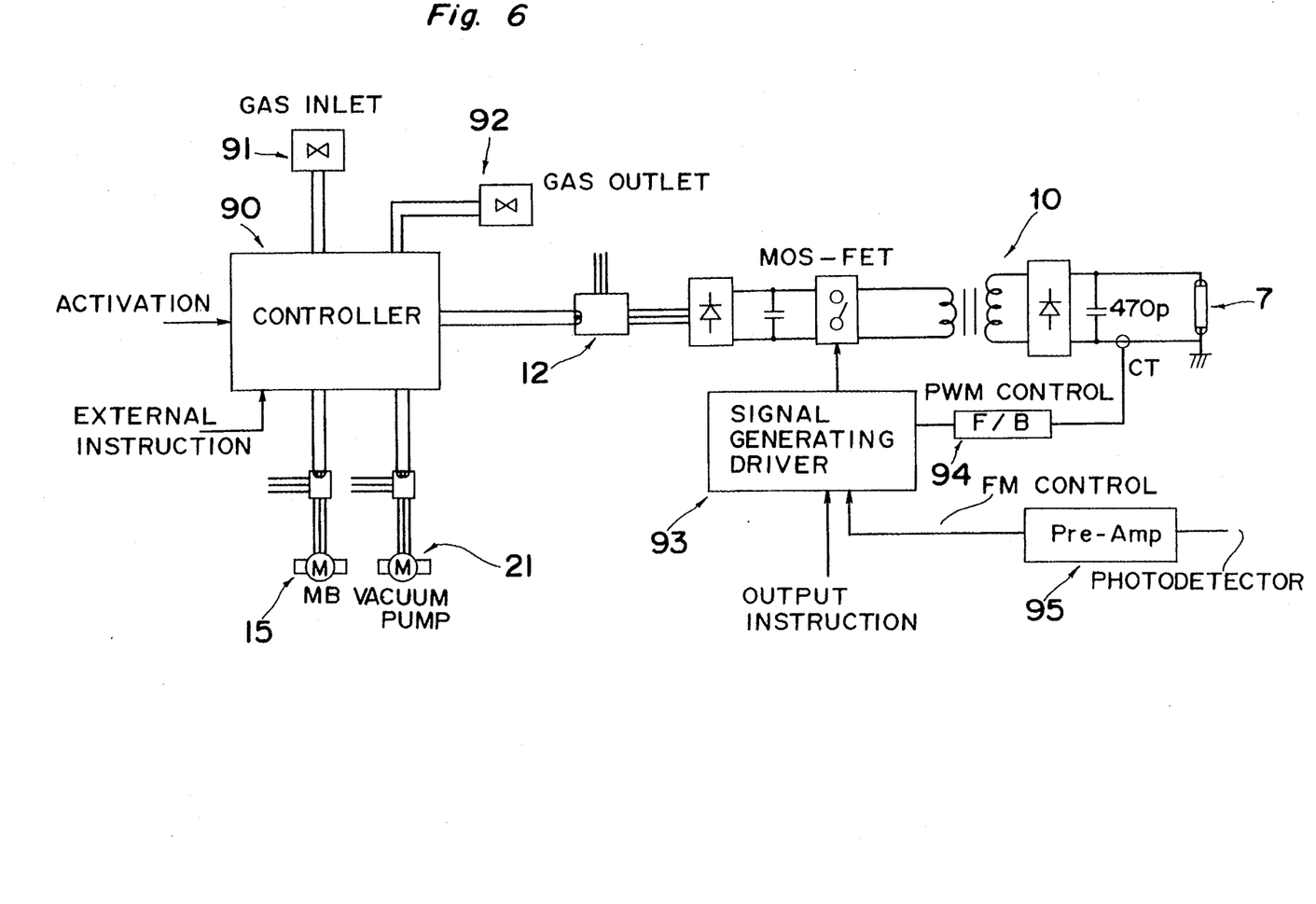
FIG. 6 is a block diagram showing a control device for controlling an intensity of laser light in the resonator.

In FIG. 6, element 90 is a controller; element 91 is a gas inlet controller for controlling gas inlet of the discharge tube 7; element 92 is a gas outlet controller for controlling gas outlet of the discharge tube 7; element 93 is a signal generating driver; element 94 is a pulse width modulation (PWM) controller constituted by a source voltage compensating circuit; and element 95 is a preamplifier for frequency modulation (FM) control. The controller 90 is connected to the gas inlet controller 91, the gas outlet controller 92, the RF source 12, the mechanical booster pump 15, and the vacuum pump 21. The RF source 12 is connected to the matching circuit network 10. The matching circuit network 10 is connected to the signal generating driver 93 through the PWM controller 94 for pulse width modulation (PWM) control and receives a signal from the signal generating driver 93 directly. The signal generating driver 93 is connected to the photodetector 36 through the preamplifier 95. When an activation signal is inputted to the controller 90, the controller 90 controls the gas inlet controller 91, the gas outlet controller 92, the RF source 12, the mechanical booster pump 15, and the vacuum pump 21. The controller 90 can also receive an external instruction for control. An output signal outputted from the photodetector 36 is inputted to the signal generating driver 93 through the preamplifier 95 for frequency modulation (FM) control so as to perform an output control. When the signal generating driver 93 receives the output signal from the photodetector 36 and also receives an output instruction, the matching circuit network 10 is controlled by the signal generating driver 93 based on the detecting result of the photodetector 36 to perform a feedback control. Thus, since the result detected by the photodetector 36 is fed back to the matching circuit network 10, the intensity of the laser light is controlled under the above feedback control.

The operation of the output mirror 1 which is the same as the terminal mirror 2 of FIG. 1 is described below with reference to FIG. 2.

A diffraction grating 24a is formed on the outer surface of the output mirror 24 where a part of the optical oscillator is not formed. A part of the light penetrating the mirror 24 is taken out in a direction of constant angle $\theta$ equal to or less than 90 degree, and consequently the intensity of the laser light is directly detected by the photodetector 36 arranged in the direction of the angle $\theta$.

The condenser lens 34 and the wavelength window 35 are placed in front of the photodetector 36 on the optical axis of the angle $\theta$ so as to condense the laser light sufficiently onto photodetecting elements of the photodetector 36 and to avoid any influence of the external light, respectively. Since the condenser lens 34, the wavelength window 35, and the photodetector 36 are formed in one unit and fixed at a predetermined position to the mirror surface, it is not necessary to readjust the photodetector 36 through optical adjustment such as tuning. Moreover, since the distributing angle and the distributing intensity of the laser light by the diffraction grating 24a are determined by the diffraction grating pattern, and accordingly the taking out-angle and the taking out-intensity of the laser light can be designed freely, the detecting properties of the photodetector 36 are not strictly limited. The laser light is normally not over the permissible incident energy of the photodetector 36. Even if the intensity of the laser light exceeds the permissible incident energy of the photodetector 36 because of a manufacturing trouble of the diffraction grating pattern, the intensity of the detected light can be decreased directly by turning the detected light to a secondary diffracted light. The destruction of the photodetector 36 is hence prevented.

Figure 7:
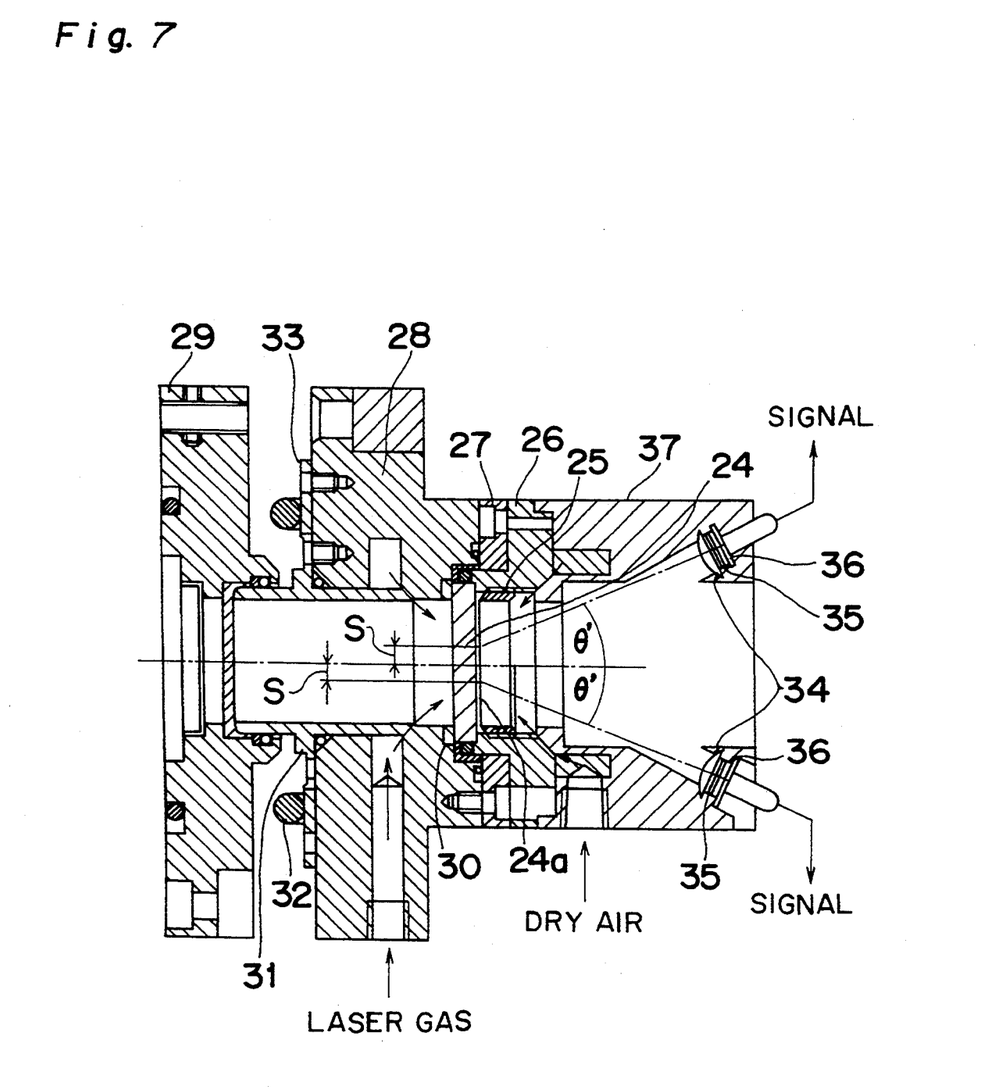
FIG. 7 is a cross-sectional view showing the structure when the center of the visual field of each photodetector is not coincident with the center of a mirror.

In a modified embodiment shown in FIG. 7, a diffraction grating is located outside the output mirror 24 and a plurality of photodetectors 36 are provided in the laser resonator. Only the number of the photodetectors 36 is increased, and the constitution of the laser resonator is the same as FIG. 1. The transverse mode is the spatial intensity distribution of the laser light. It is necessary to obtain the concentric intensity distribution if the laser light is to be utilized for the processing of materials. If the transverse mode of the laser light passing the output mirror 24 is not concentric, the intensity of the laser light entering a plurality of the photodetectors 36 on the circumference of the above taking out-angle becomes different, bringing about a difference in output signals of the photodetectors 36. Therefore, the angle of the output mirror 24 is adjusted or controlled to make the difference of the output signals of the confronting photodetectors 36 zero. Then, as shown in FIG. 7, the angles $\theta'$ of the photodetectors 36 to the optical axis of the laser light are the same, and the distances (s) between the optical axis of the resonator and reflected points on the mirror 24 from which the taking out-part of the laser light is incident on the photodetectors 36 are equal. It is to be noted here that FIG. 1 illustrates an embodiment wherein the center of the visual field of the photodetector 36 is coincident with the center of the mirror 24, while FIG. 7 indicates an embodiment wherein the center of the visual field of each photodetector is not the center of the mirror 24. Although the center of a visual field of the photodetector is not shifted from the center of the mirror 24 in FIG. 1, the center of a visual field of each of said photodetectors is shifted from the center of the mirror 24 in FIG. 7.

Figure 10:
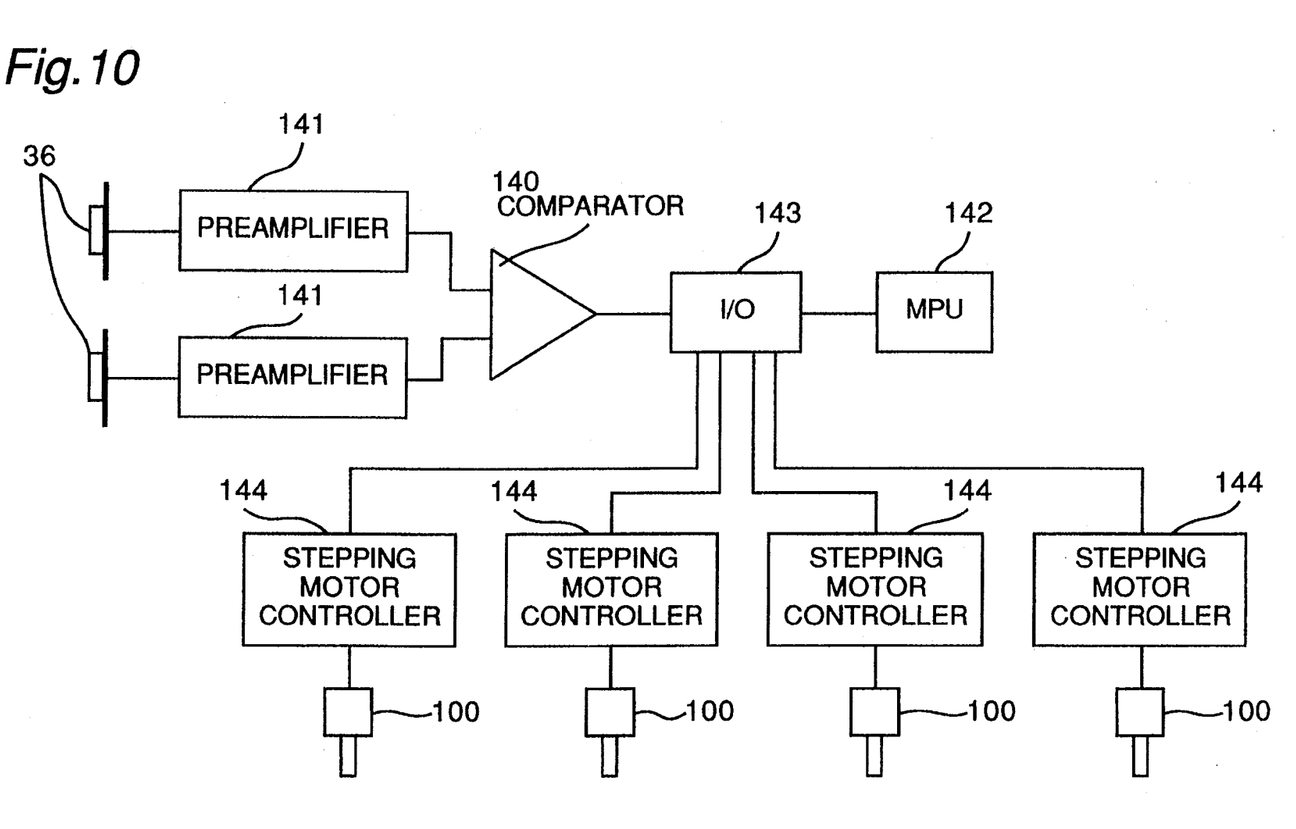
FIG. 10 is a block diagram showing a mode adjustment feedback control in the laser resonator.

FIG. 10 is a block diagram showing a mode adjustment feed back control in the laser resonator. That is, the pair of photodetectors 36 output signals to a comparator 140 through preamplifiers 141. The comparator 140 compares the signals with each other and then the result is inputted to a MPU 142 through input/output device 143. The MPU 142 controls four stepping motor controllers 144 connected to four stepping motors 100 via the input/output device 143 so as to cancel the difference between the signals inputted to the MPU 142 for the mirror adjustment. Another pair of photodetectors 36 can be provided together with two preamplifiers 141 corresponding to the photodetectors 36 and a comparator 140 connected to the two preamplifiers 141.

Figure 8:
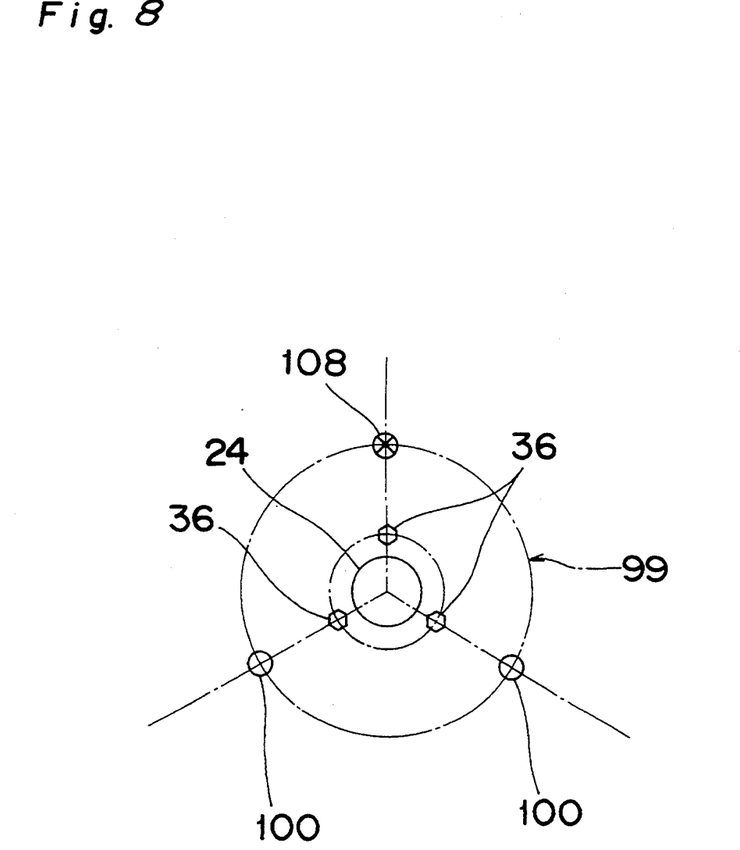
FIG. 8 is an example of the layout of the photodetectors according to the embodiment wherein angle adjusting shafts of the mirror are arranged on the same circumference outside the mirror.
Figure 9:
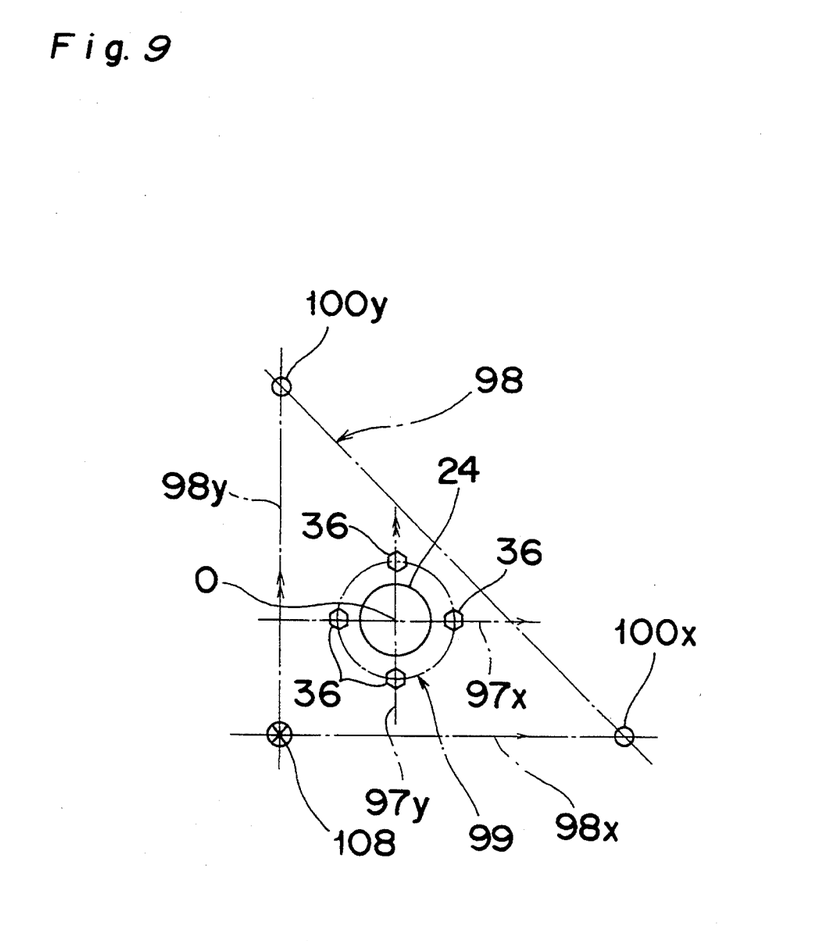
FIG. 9 is a view showing an example of the layout of the photodetectors wherein angle adjusting shafts of the mirror are arranged in a right triangle outside the mirror.

FIGS. 8 and 9 are examples of the layout of the photodetectors 36 of the embodiment of the present invention.

In FIG. 8, the adjusting shafts 100 and the fixed shaft 108 to adjust the angle of the mirror 24 are arranged on the same circumference 99 outside the mirror 24. When the same number of photodetectors 36 are set in the same direction as the adjusting shafts 100 and the fixed shaft 108 on the circumference 99 of the taking out-angle, the shifting direction of the transverse mode and the signals of the photodetectors 36 are agreed each other, so that the angle of the mirror 24 can be easily adjusted or controlled.

On the other hand, FIG. 9 shows an example when the adjusting shafts 100 and the fixed shaft 108 of the mirror 24 are arranged in the form of a right triangle 98 outside the mirror 24. In this case, if four photodetectors 36 are arranged at intersections of lines 97x and 98y passing the circumference 99 of the taking out-angle and the center (O) of the mirror 24 and at the same time, parallel to the two shorter sides 98x and 98y of the right triangle 98, the shifting direction of the transverse mode and the signals of the photodetectors 36 agree, whereby the angle of the mirror 24 can be adjusted or controlled easily. The two photodetectors 36 on the line 97y detect the inclination of the mirror 24 in the vertical line in FIG. 9, while the two photodetectors 36 on the line 97x detect the inclination of the mirror 24 in the horizontal line in FIG. 9.

As is clear from the foregoing description of the present invention, a diffraction grating is provided at one side of an output or terminal mirror to take out a part of laser light in a direction of a predetermined angle. The intensity of the taken-out laser light is detected by a photodetector, so that the laser output is controlled. The intensity of the laser light is detected otherwise by a plurality of photodetectors set on a circumference of the above-noted taking out-angle, thereby to adjust or control the angle of the mirror so that the output signals of the photodetectors become equal. Accordingly, the number of assembling and adjusting steps of the laser resonator can be remarkably reduced and the detecting mechanism to detect the laser light is highly improved in its reliability and safety.

According to the present invention, a diffraction grating is arranged at the outer surface of one of reflecting mirrors serving as an output mirror or a terminal mirror where an optical oscillator is not present and, a part of the light passing through the mirror is taken out with a predetermined angle. Therefore, the light can be detected directly without being passed through an integrating sphere, with the intensity thereof not changed, by a photodetector arranged on the above-noted angles.

The distribution of the laser light by the diffraction grating is determined by the pattern of the diffraction grating. Since the angle and the intensity with which the laser light is taken out can be designed freely, it decreases restrictions on the layout of the photodetector. Moreover, the intensity of the laser light entering the photodetector is restricted not to go beyond the tolerance of the photodetector. In case that the intensity of the laser light exceeds the permissible incident energy due to some reason from manufacturing viewpoint of the diffraction grating pattern, the intensity of the detecting light is directly reduced by turning the detecting light to a secondary diffraction light, thus preventing the destruction of the photodetector.

The transverse mode is the spatial intensity distribution of the laser light. If the transverse mode is not concentric, the intensity of light entering a plurality of photodetectors on the circumference of the above-noted taking out-angle becomes different, thereby causing the difference in output signals of the photodetectors. In comparison with the prior art that the angle of the reflecting mirror has been adjusted by collecting and evaluating the burning pattern when the laser light is cast on acrylic acid or the like, the present invention makes it possible to adjust or control the angle of the reflecting mirror to negate the difference of the output signals of the confronting photodetectors.

Further, in the case where adjusting shafts to adjust the angle of the reflecting mirror are arranged on the same circumference outside the reflecting mirror, the shifting direction of the transverse mode and the output signals of the photodetectors agree when the same number of photodetectors are provided in the same direction as the adjusting shafts on the circumference of the taking out-angle, thereby allowing easy adjustment or control of the angle of the reflecting mirror.

When the angle adjusting shafts for the reflecting mirror are arranged in the configuration of a right triangle outside the reflecting mirror, and if four photodetectors are provided at intersections of lines passing the circumference of the taking out-angle and the center of the reflecting mirror, and also parallel to the two shorter sides of the right triangle, the shifting direction of the transverse mode and the signals of the photodetectors agree with each other, whereby the angle of the reflecting mirror can be adjusted or controlled with ease.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A laser resonator comprising:
   an optical oscillator including a discharge tube, and a pair of reflecting mirrors arranged at both ends of the discharge tube while inner surfaces of the mirrors confront each other;
   electrodes confronting each other with the discharge tube held therebetween;
   a gas pipe connected to the optical oscillator; and
   a gas circulating device connected to the gas pipe for circulating laser gas,
   wherein the laser resonator generates laser light when a voltage impressed to the electrodes invites discharge of the discharge tube while laser gas is circulated in the discharge tube by the gas circulating device,
   the laser resonator further comprising:
   a diffraction grating provided at one outer surface of either of the pair of reflecting mirrors to take out a part of the laser light passing through the reflecting mirror in a direction of a predetermined angle; and
   a photodetector for detecting an intensity of the laser light, the photodetector being disposed in the direction of the predetermined angle of the part of the taken-out laser light.

2. The laser resonator as claimed in claim 1, further comprising:
   a control device for controlling the voltage impressed to the electrodes so as to adjust the intensity of the laser light; and
   a feedback control means for receiving an output signal outputted from the photodetector and for feeding the output signal back to the control device.

3. A laser resonator comprising:
   an optical oscillator including a discharge tube, and a pair of reflecting mirrors arranged at both ends of the discharge tube while inner surfaces of the mirrors confront each other;
   electrodes confronting each other with the discharge tube held therebetween;
   a gas pipe connected to the optical oscillator; and
   a gas circulating device connected to the gas pipe for circulating laser gas,
   wherein the laser resonator generates laser light when a voltage impressed to the electrodes invites discharge of the discharge tube while laser gas is circulated in the discharge tube by the gas circulating device,
   the laser resonator further comprising:
   a diffraction grating provided at an outer surface of each of the pair of reflecting mirrors to take out a part of the laser light passing through the reflecting mirror in a direction of a predetermined angle to form a circumference of the laser light outside the reflecting mirror;
   photodetectors set on each circumference of the above taking out-angle for detecting an intensity of the laser light; and
   an inclining device for inclining each mirror so that output signals of the photodetectors set on each circumference agree with each other.

4. The laser resonator as claimed in claim 3, further comprising:
   a first control device for controlling the voltage impressed to the electrodes so as to adjust the intensity of the laser light;
   a second control device for controlling driving of the inclining device; and
   a feedback control means for receiving output signals outputted from the photodetectors and for feeding the output signals back to the first and second control devices.

5. The laser resonator as claimed in claim 3, wherein the inclining device has a fixed shaft serving as a fulcrum and two adjusting shafts movable in their axes directions which are arranged on the same circumference at 120 degree intervals, and three of the photodetectors are arranged at 120 degree intervals to correspond to the three shafts so that the adjusting shafts are moved so that the output signals of the photodetectors set on each circumference agree with each other.

6. The laser resonator as claimed in claim 3, wherein the inclining device has a fixed shaft serving as a fulcrum and two adjusting shafts movable in their axes directions which are respectively arranged on vertexes of a right triangle, and four of the photodetectors are arranged at four intersections of two lines passing the circumference of the taking angle and a center of the mirror with the two lines parallel to two shorter sides of the right triangle so that the adjusting shafts are moved so that the output signals of the photodetectors set on each circumference agree with each other.

7. The laser resonator according to claim 3, wherein a center of a visual field of each of the photodetectors is shifted from a center of the mirror.

8. The laser resonator according to claim 7, wherein distances between an optical axis of the resonator and reflected points on the mirror from which the taking out-part of the laser light is incident on the photodetectors are equal.

* * * * *